(12) United States Patent
Kobayashi

(10) Patent No.: US 6,450,684 B2
(45) Date of Patent: Sep. 17, 2002

(54) RADIOGRAPHIC APPARATUS, RADIOGRAPHIC TABLE AND RADIOGRAPHIC SYSTEM

(75) Inventor: Masaaki Kobayashi, Kokubunji-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/741,088

(22) Filed: Dec. 21, 2000

(30) Foreign Application Priority Data

Dec. 24, 1999 (JP) ............................. 11-368207
Aug. 21, 2000 (JP) ......................... 2000-249860

(51) Int. Cl.$^7$ ............................................. G03B 42/02
(52) U.S. Cl. ........................... 378/177; 378/181; 378/67
(58) Field of Search ................................. 378/174, 177, 378/178, 191, 194, 195, 189, 167

(56) References Cited

U.S. PATENT DOCUMENTS

| | | | |
|---|---|---|---|
| 4,468,803 A | | 8/1984 | Ronci ......................... 378/181 |
| 4,760,591 A | | 7/1988 | Gallop et al. ................ 378/170 |
| 5,023,899 A | * | 6/1991 | Ohlson ........................ 378/196 |
| 5,157,707 A | * | 10/1992 | Ohlson ........................ 378/181 |
| 5,280,514 A | | 1/1994 | Tago et al. .................. 378/187 |
| 5,572,567 A | * | 11/1996 | Khutoryansky et al. ..... 378/197 |
| 5,764,724 A | | 6/1998 | Ohlson ........................ 378/177 |
| 6,075,256 A | | 6/2000 | Kaifu et al. ................... 257/53 |
| 6,095,685 A | * | 8/2000 | Tamura ....................... 378/196 |
| 6,177,237 B1 | * | 1/2001 | Guida et al. ................ 430/320 |

FOREIGN PATENT DOCUMENTS

| | | |
|---|---|---|
| EP | 0 379 629 | 8/1990 |
| JP | 57-010440 A * | 1/1982 ................ 378/81 |
| JP | 8-116044 | 5/1996 |
| SE | 8900580 A * | 2/1989 |

* cited by examiner

Primary Examiner—Robert H. Kim
Assistant Examiner—Elizabeth Gemmell
(74) Attorney, Agent, or Firm—Fitzpatrick, Cella, Harper & Scinto

(57) ABSTRACT

An X-ray image receiver is supported through a guide mechanism on a support bench. The guide mechanism consists of a pair of first guide members, a pair of first sliding members, a pair of second sliding members, a pair of third sliding members, a pair of second guide members, and a rotation link member. The first guide members, which are disposed opposite to each other, extend on top of the support bench along the shorter side of the tabletop. The first sliding members are slidably installed on the inside of the first guide members. The second sliding members are slidably installed on the inside of the first sliding members. The third sliding members are secured to the sides of the X-ray image receiver. The second guide members are installed on the outside of the third sliding members. The rotation link member rotatably links the second guide members with the second sliding members. Using a lock lever, the third sliding members are locked so that they do not slide with respect to the second guide members. Thus the X-ray image receiver can move along the shorter side of the tabletop. In addition, the receiver can be changed to a vertical position, and its height can be adjusted. This, in turn, means that the radiographic region covered by the radiation image receiver can properly be adjusted suitably for a test subject and a radiographic method.

28 Claims, 13 Drawing Sheets

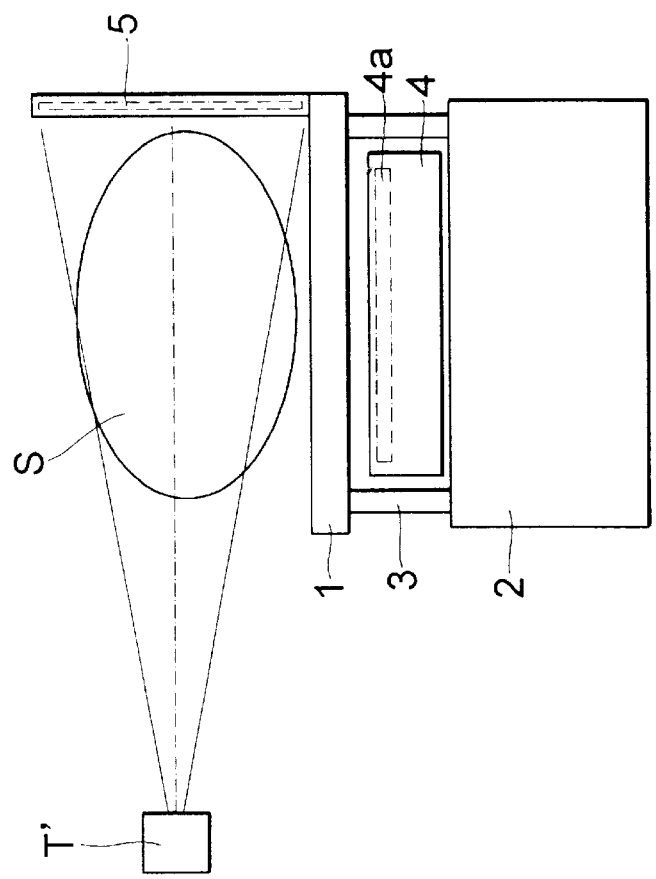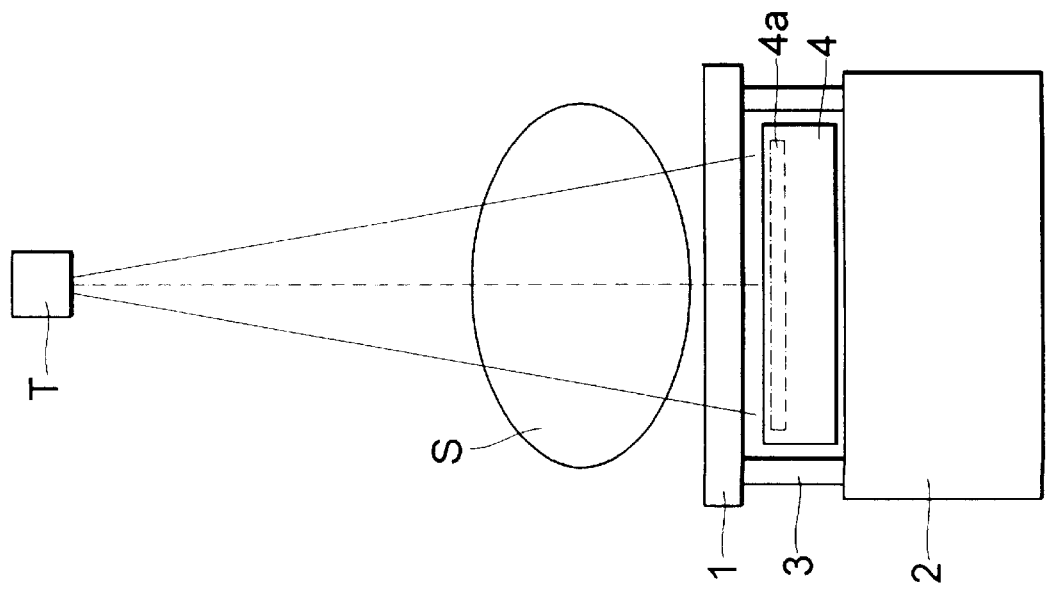

RADIOGRAPHIC APPARATUS, RADIOGRAPHIC TABLE AND RADIOGRAPHIC SYSTEM

BACKGROUND OF THE INVENTION

1. Field of the Invention

The present invention relates to a radiographic apparatus, a radiographic table, and a radiographic system which are intended to image radiation, such as X-rays, using a radiation image receiver after it passes through a test subject.

The present invention relates especially to a radiographic apparatus, a radiographic table, and a radiographic system in which radiation, such as X-rays, is projected to a test subject lying on the top of a table, a bed, etc., and the radiation having passed through the test subject is imaged with the radiation image receiver disposed below or beside the top.

2. Related Background Art

Conventional radiographic apparatuses having a radiographic table with a radiographic receiver are used in a variety of fields, such as medical diagnosis and non-destructive inspection. These apparatuses use so-called radiography, which uses sensitizing paper and radiographic film brought into close contact with each other. When radiation is incident on sensitizing paper in such a radiographic apparatus after passing through a test subject, phosphors contained in the sensitizing paper absorb radiation energy and fluoresce. Then radiographic film is exposed to fluorescence, so that a radiation image is recorded on the film. And visible radiation image is obtained by developing the film.

An image recording/reproducing apparatus was recently invented which has a radiation detector including photostimulable phosphors. When radiation passes through a subject and is incident on photostimulable phosphors, constituting the radiation detector, the phosphors accumulate part of the radiation energy received. When the photostimulable phosphors are exposed to light, for example, visible light, they exhibit an accelerated phosphorescence emission according to the amount of radiation energy accumulated. That is, the photostimulable phosphors collect information on an radiation image of the subject; scanning means scans the photostimulable phosphors, using excitation light, such as laser beams; signal reading means reads the light of the accelerated phosphorescence emission photoelectrically; and recording material, such as photosensitive material, or displaying means, such as a CRT, records or displays read image information as a visible image.

Because of advanced semiconductor processing technology, digital radiation image detectors have been proposed which directly supply digital radiation image data on a real-time basis. Such a digital radiation image detector is disclosed in, for example, Japanese Patent Application Laid-Open No. 8-116044. The digital radiation image detector comprises a scintillator and a solid-state light detector, which are placed one on top of the other. The scintillator converts radiation into visible light, and the solid-state light detector converts visible light into electricity. The solid-state light detector can be produced by disposing on a substrate made of silica glass a matrix of solid-state light detecting elements which consist of an amorphous semiconductor film and conductive films which sandwich the semiconductor film. One of the conductive films is transparent.

Because a digital radiation image detector of this type is flat and a few millimeters thick, using such a detector for a radiation image receiver helps reduce the thickness and weight. Moreover, a radiation image receiver containing such a digital radiation image detector directly provides a digital image without using consumables, such as a film and a photostimulable phosphor sheet. Thus, the radiation image receiver is free from repeated operations which conventional radiation image detectors need, such as loading a cassette containing a film or a photostimulable phosphor sheet at a predetermined position, unloading the cassette after imaging and developing or processing the film or the photostimulable phosphor sheet. This, in turn, means that the radiographer is released from troublesome operations.

SUMMARY OF THE INVENTION

It is an object of the present invention to provide a radiographic apparatus, a radiographic table with a radiation image receiver, and a radiographic system which allow the radiographic region covered by the radiation image receiver (the position or the posture of the radiation image receiver) to be properly adjusted according to a test subject, a method for radiographing a test subject (i.e., the direction in which a test subject is exposed to radiation and the posture of the subject), etc.

It is another object of the present invention to propose a radiographic apparatus and a radiographic system which allow the position of a radiation source to be properly adjusted according to a test subject, a method for radiographing a test subject (i.e., the direction in which a test subject is exposed to radiation and the posture of the subject), etc.

Other objects of the present invention will become clear from the following description of embodiments.

BRIEF DESCRIPTION OF THE DRAWINGS

FIG. 1 illustrates a radiographic method of an embodiment required, as a premise by the present invention;

FIG. 2 illustrates a radiographic method of an embodiment required, as a premise by the present invention;

DETAILED DESCRIPTION OF THE PREFERRED EMBODIMENTS

Figure 3:
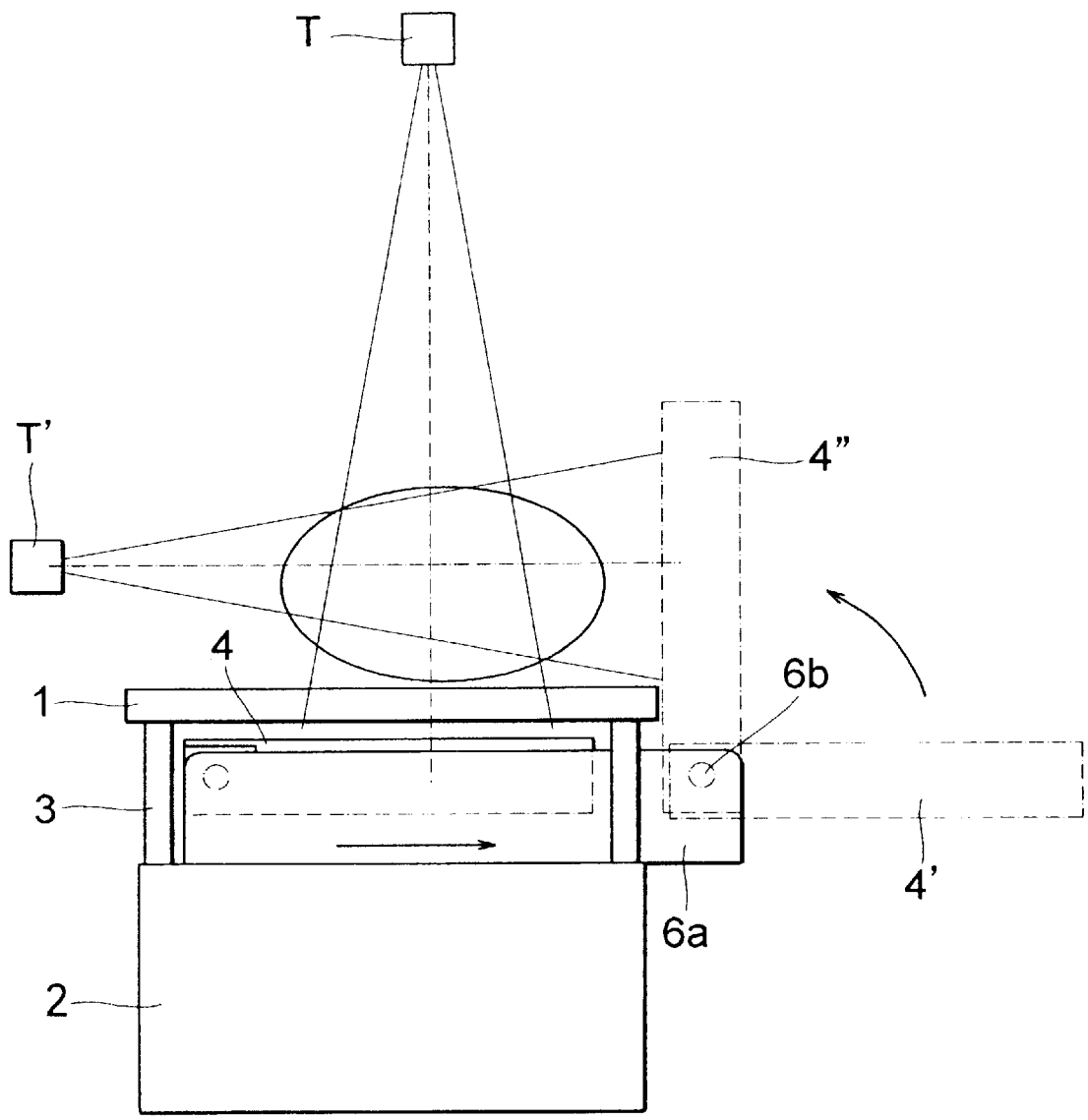
FIG. 3 illustrates a radiographic method of an embodiment required, as a premise by the present invention.

Referring now to FIGS. 1 through 5, the embodiments of an invention required, as a premise by the present invention, will be described below. FIG. 1 shows a Bucky's radiographic table which can be used for plain imaging of the limb, the head, the abdomen, or the like of a test subject S. A tabletop 1, on which the test subject S lies, is supported by supports 3 in its four corners on a support bench 2. An X-ray image receiver 4 is disposed on top of the support bench 2 under the tabletop 1. A digital X-ray image detector is installed in a space 4a in the X-ray image receiver 4. When the test subject S, lying on his or her back or face, is radiographed, X-rays are aimed at the subject S from a tube T above the subject S, and the X-ray image receiver 4 receives X-rays after they pass through the subject S.

As shown in FIG. 2, when the subject S, lying on his or her back or face on the tabletop 1, is radiographed from his or her side, X-rays are aimed at the subject S from a tube T' on one side of the subject S, and in place of the X-ray image receiver 4 under the tabletop 1, a cassette 5 containing a film or a photostimulable phosphor sheet, which stands up on the tabletop 1 on the other side of the subject S, receives X-rays after they pass through the subject S.

On the other hand, the digital X-ray image detector may be substituted for the cassette 5. In this case, a radiographic table in FIG. 3 is considered to be used which allows the position of the X-ray image receiver 4 to be changed. The radiographic table comprises a guide rail 6a which guides the X-ray image receiver 4 along the shorter side of the tabletop 1 and a shaft 6b which allows the X-ray image receiver 4, which is drawn out from under the tabletop 1, to rotate so that its receiving surface is vertical (vertical posture). Because the radiographic table allows the X-ray image receiver to be moved from a horizontal posture to a vertical posture as described above, the test subject S can easily be radiographed in different directions, using one X-ray image receiver 4.

The radiographic table allows the X-ray image receiver 4 to be pulled outside the tabletop 1 to the horizontal position 4', in which the receiver is not under the tabletop 1, and to be changed to the vertical posture 4" from the horizontal posture 4'. The receiving surface of the receiver in the state of the vertical posture 4" is perpendicular to that in the state of the horizontal posture 4'. When the X-ray image receiver 4 is in the horizontal position 4', the test subject S can directly place on the X-ray image receiver 4 his or her hand or leg to be radiographed. Because of this, the hand or leg can be brought close to the X-ray image receiver 4, thus a good image is obtained, without X-ray absorption or scatter by the tabletop 1.

When the test subject S, lying on his or her back or face, is radiographed using the tube T' on the side of the subject S, a whole part to be radiographed of the subject S is near the tabletop 1 and completely falls within the radiographic region converted by the X-ray image receiver 4.

In contrast, when the test subject S, with water or the like collected in the chest, is radiographed, lying on his or her side, the upper end of a part to be radiographed of the subject S is outside the radiographic region covered by the X-ray image receiver 4. Thus the X-ray image receiver must be moved up.

In many cases, this kind of radiographic table uses a grid which reduces X-rays which are scattered at the test subject S and entering the X-ray image receiver. When the grid is used, the grid is disposed in front of the X-ray image receiver. Because the grid has a focal point in this case, the tube T' and the center of the radiographic region covered by the X-ray image receiver 4" must be aligned even when the subject is radiographed, with the X-ray image receiver 4 in a vertical posture 4'.

Figure 4:
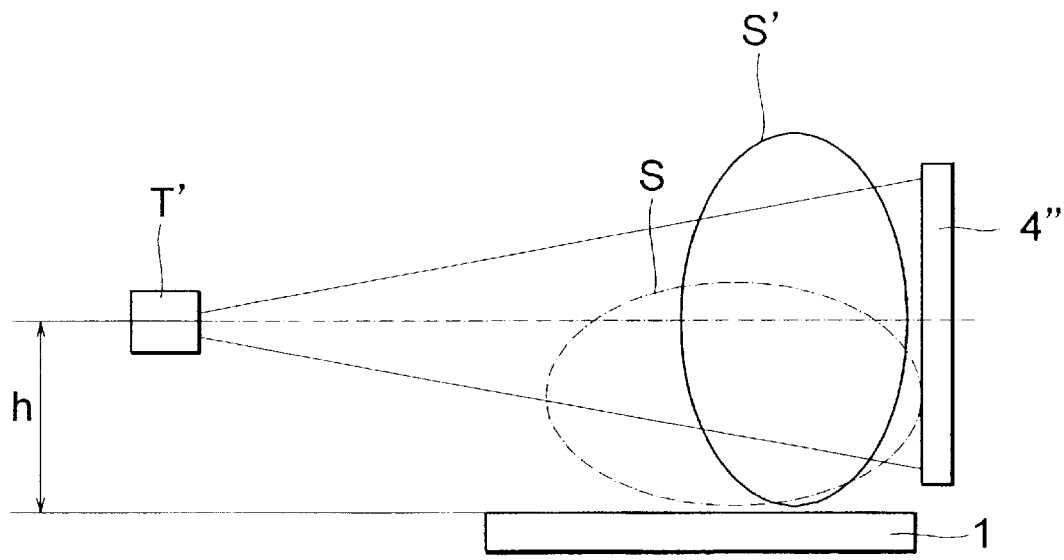
FIG. 4 illustrates a radiographic region of an embodiment required, as a premise by the present invention.
Figure 5:
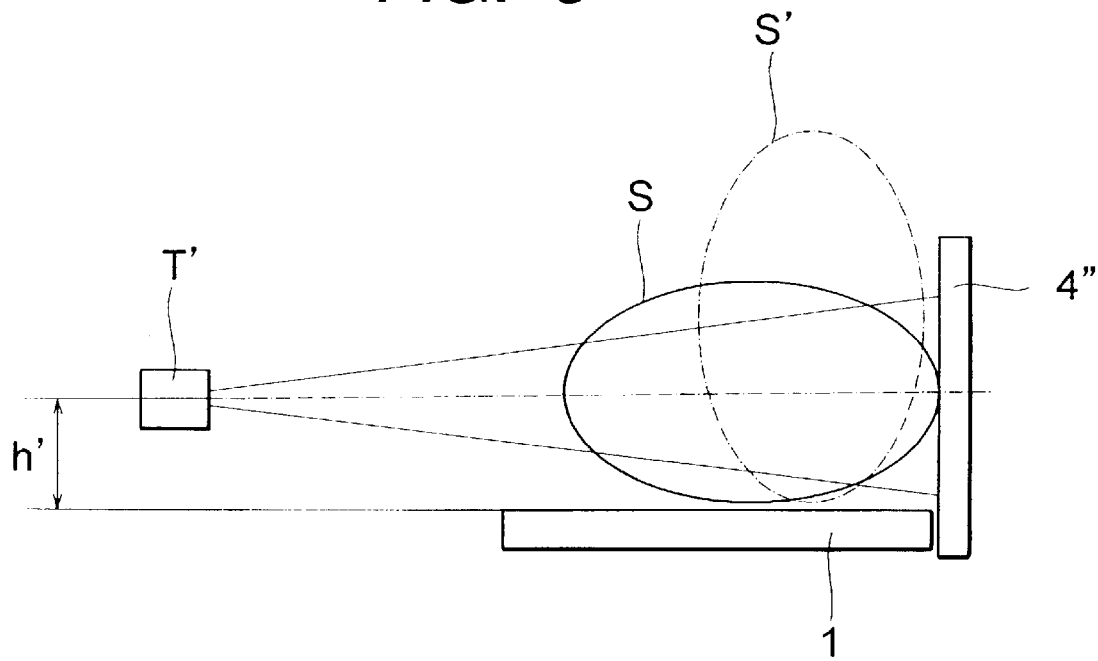
FIG. 5 illustrates a radiographic region of an embodiment required, as a premise by the present invention.

However, as shown in FIG. 4, if the top of the X-ray image receiver 4" is positioned high, and the height h of the tube T' is set at the center of the radiographic region covered by the receiver to broaden the region of the test subject S' to be radiographed, the test subject S' can satisfactorily be radiographed when he or she is lying on his or her side but cannot when he or she is lying on his or her back or face in a lower position. On the other hand, as shown in FIG. 5, if the top of the X-ray image receiver 4" is positioned low, and the height h of the tube T' set at the center of the radiographic region covered by the receiver to satisfactorily radiograph the test subject S' when he or she is lying on his or her back or face, a high part of the subject cannot satisfactorily be radiographed when he or she is lying on his or her side.

Figure 6:
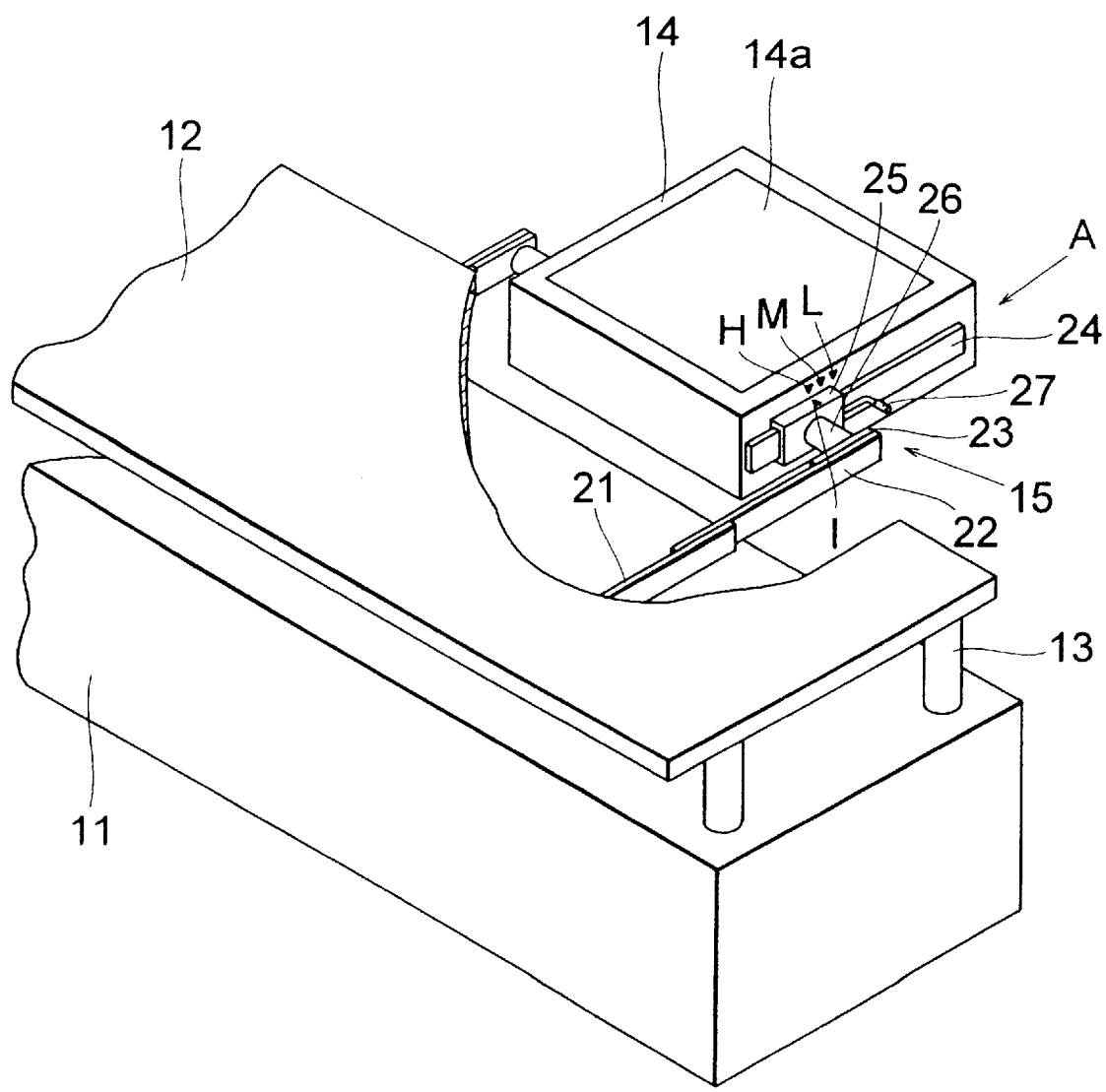
FIG. 6 is a partially cutaway perspective view of a first embodiment of the present invention.

Referring now to FIGS. 6 through 10, the present invention, which is free from these problems, will be described in detail below. FIG. 6 is a partial perspective view of a first embodiment of the present invention, with a portion cutaway. As shown in the figure, a tabletop 12 is supported in a substantially horizontal position above a support bench 11 through, for example, supports 13 in four corners. The tabletop 12, on which a test subject lies, is made of an acrylic plate, a carbon plate, wood, etc. An X-ray image receiver 14, containing a digital X-ray detector, is disposed on top of the support bench 11 under the tabletop 12. The digital X-ray detector comprises a radiation detector and a signal reading circuit. The radiation detector comprises solid-state detection elements laid out two-dimensionally. The signal reading circuit reads a signal from the radiation detector. The X-ray image receiver 14 is movable along the shorter side of the tabletop 12 under the action of a guide mechanism 15. After being pulled outside above the tabletop 12, the receiver is rotatable so that its X-ray receiving surface can be set vertical. Before rotating, the receiver can be changed in its position along the shorter side of the tabletop 12.

Figure 7:
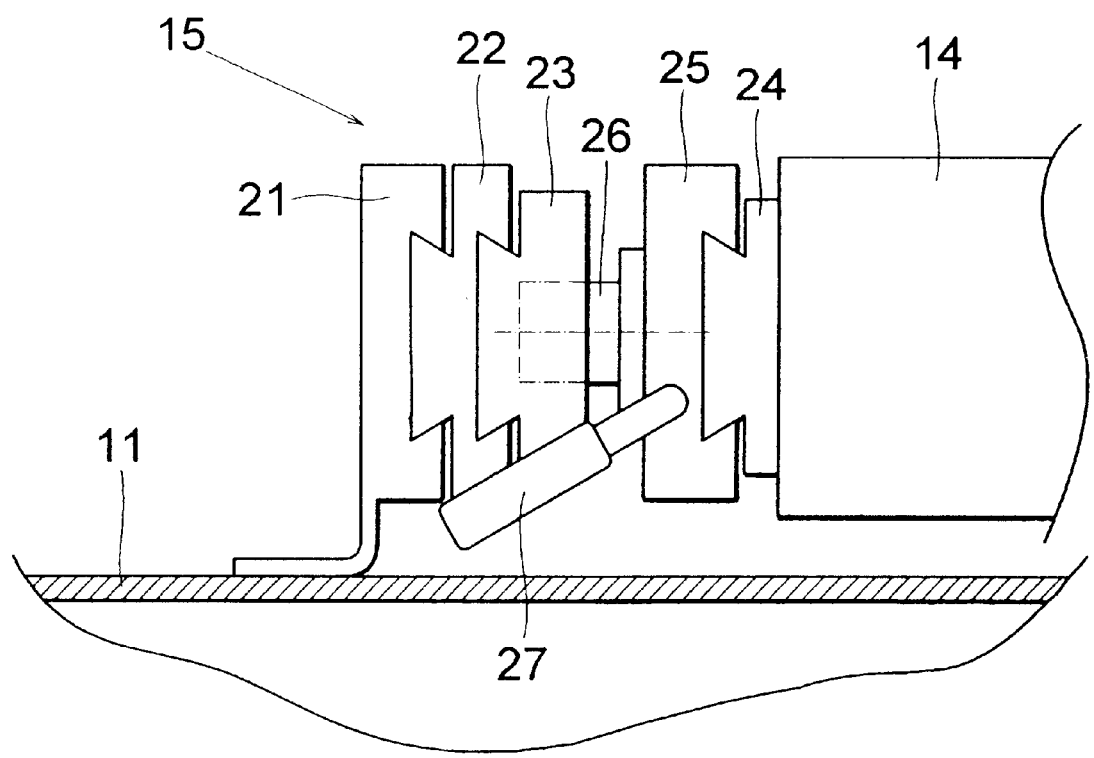
FIG. 7 is a partially enlarged view of FIG. 6 as seen in a direction A.

FIG. 7 is a partially enlarged view of the guide mechanism 15 as seen along the shorter side of the tabletop 12, that is, in a direction A. The guide mechanism 15 comprise a pair of first guide members 21, a pair of first sliding members 22, a pair of second sliding members 23, a pair of third sliding members 24, a pair of second guide members 25, and a rotation link member 26. The first guide members 21, which are disposed opposite to each other, extend on top of the support bench 11 along the shorter side of the tabletop 12. The first sliding members 22 are slidably installed on the inside of the first guide members 21. The second sliding members 23 are installed on the inside of the first sliding members 22. The third sliding members 24 are secured on the sides of the X-ray image receiver 14. The second guide members 25 are installed on the outside of the third sliding members 24 to slidably guide the third sliding members 24. The rotation link member 26 rotatably links the second guide members 25 with the second sliding members 23.

A lock lever 27 which locks the third sliding members 24 so that they do not slide with respect to the second guide members 25 is attached to the second guide members 25 by, for example, screwing. A mark I is provided on top of the second guide members 25. Marks H, M, and L are provided on a side of the X-ray image receiver 14 to position it at, for example, three levels: high, intermediate, and low.

The first guide members 21 and first sliding members 22 are connected together, using a dovetail and a dovetailed groove, for example. The first sliding members 22 and the second sliding members 23 are connected together in the same way. Such is the case with the third sliding members 24 and the second guide members 25. The rotation link member 26 can rotate with respect to, for example, the second sliding members 23, while the member 26 is secured to the second guide members 25. Proper friction is provided between the rotation link member 26 and the second sliding members 23 so that the X-ray image receiver 14 can be held horizontally or vertically.

When a test subject lying on his or her back or face on the radiographic table, arranged as described above, is radiographed using the tube above the tabletop 12, the X-ray image receiver 14, which is disposed horizontally under the tabletop 12, is used to receive X-rays emitted from the tube.

On the other hand, when the test subject is radiographed, using the tube on the side of the tabletop 12, the X-ray image receiver 14 is made vertical, using the guide mechanism 15. That is, the X-ray image receiver 14 is moved along the shorter side of the tabletop 12 until the receiver protrudes sideward from the tabletop. Here the first sliding members 22 slide with respect to the guide members 21, and the second sliding members 23 slide with respect to the first sliding members 22. Thus the X-ray image receiver 14 slides a long distance in two steps, so that the photographic region 14a of the X-ray image receiver 14 completely comes out from under the tabletop 12.

The lock lever 27 is loosened. Next, the position of the X-ray image receiver 14 with respect to the second guide members 25, that is, the horizontal position of the third sliding members 24 is adjusted. Then the lock lever 27 is tightened. For example, to lift the radiographic region covered by the X-ray image receiver 14, the lock lever 27 is loosened, the X-ray image receiver 14 is moved away from the tabletop 12, the mark H on the X-ray image receiver 14 is aligned with the mark I on the second guide members 25, and then the lock lever 27 is tightened. When the X-ray image receiver 14 is rotated so as to be set in the vertical posture, the rotation link member 26 rotates with respect to the second sliding members 23, so that the X-ray image receiver 14 is kept vertical at a high position. If the radiographic region covered by the X-ray image receiver 14 does not need to be adjusted, the X-ray image receiver 14 has only to be rotated immediately after the receiver protrudes from the tabletop 12.

In the first embodiment, the vertical relative distance between the X-ray image receiver 14 and the tabletop 12 can be adjusted, thus allowing the level of the X-ray image receiver 14 to be set according to a test subject. This is both because the guide mechanism 15 allows the X-ray image receiver 14 to move along the shorter side of the tabletop 12 so as to sufficiently protrude from under the tabletop 12 and because the X-ray image receiver 14 is rotated so as to be set in the vertical posture after adjusting its position (position of the X-ray image receiver in a horizontal plane with respect to the rotation axis, which position corresponds to the level of the X-ray image receiver after rotation).

A two-dimensional radiation detector which differs in shape and characteristics from a conventional detector using a film or a photostimulable phosphor sheet can be used efficiently to radiograph a test subject in a plurality of directions and in suitable conditions with one X-ray image receiver 14, thus providing an X-ray image effective for diagnosis. Because the position of the X-ray image receiver 14 is adjusted before the X-ray image receiver 14 is changed to the vertical posture, the guide mechanism 15 is simple.

Figure 8:
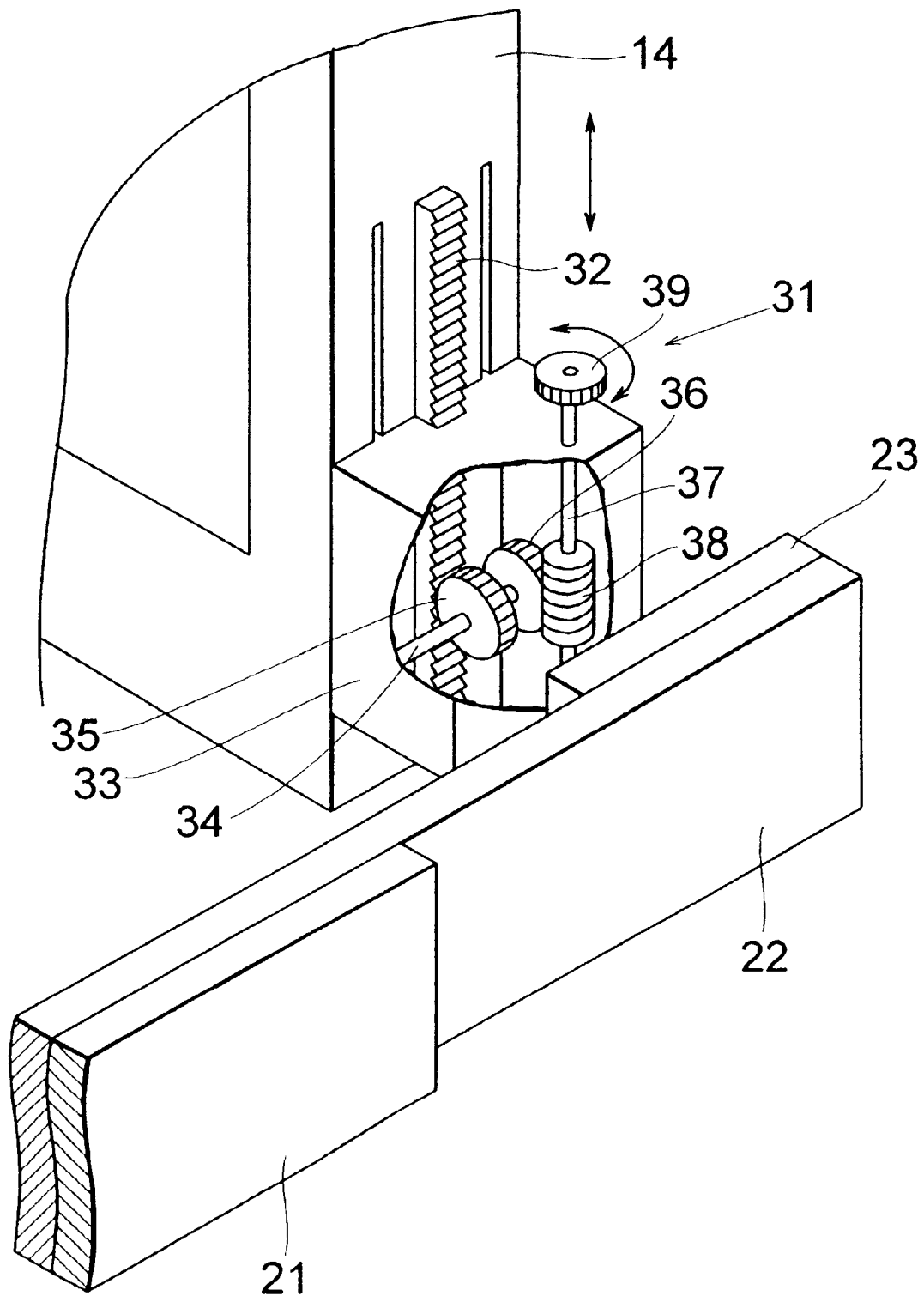
FIG. 8 is a partially enlarged perspective view of a second embodiment of the present invention, with a portion cutaway.

FIG. 8 is a partially enlarged perspective view of a second embodiment of the present invention, with a portion cutaway. In the figure, the X-ray image receiver 14 is changed to a vertical posture. A guide mechanism 31 is adapted so that the level of the X-ray image receiver 14 can be adjusted after it is changed to a vertical posture. As is the case with the first embodiment, the guide mechanism 31 is provided with the first guide members 21, first sliding members 22, second sliding members 23, and rotation link member 26. A pair of racks 32 is secured on both sides of the X-ray image receiver 14. A second guide member 33 like a box is connected with each side of the receiver and secured to the rotation link member 26. Using, for example, a dovetailed groove and a dovetail, the X-ray image receiver 14 is slidably connected with the second guide member 33.

The rack 32 is engaged with a pinion 35, which is supported through a gear shaft 34 by the second guide member 33. A wheel gear 36 is concentrically supported on the gear shaft 34. The wheel gear 36 is engaged with a worm gear 38 which is supported through a gear shaft 37 by the second guide member 33. A knob 39 is attached to the gear shaft 37 outside the second guide member 33.

To adjust the vertical distance between the tabletop 12 and X-ray image receiver 14, the X-ray image receiver 14 is protruded from under the tabletop 12 and rotated, and then the knob 39 is rotated in the direction indicated by an arrow. This rotation causes the worm gear 38 to rotate, thus rotating the wheel gear 36 and pinion 35 together. As a result, the rack 32 moves, so that the X-ray image receiver 14 moves up and down.

In a second embodiment, the structure of the guide mechanism 31 is a little more complicated than in the first embodiment. However, the level of the x-ray image receiver 14 can be adjusted according to a test subject because it can be moved up and down after it is made vertical. Providing the worm gear 38 with a self-locking function prevents the X-ray image receiver 14 from descending under gravity.

Figure 9:
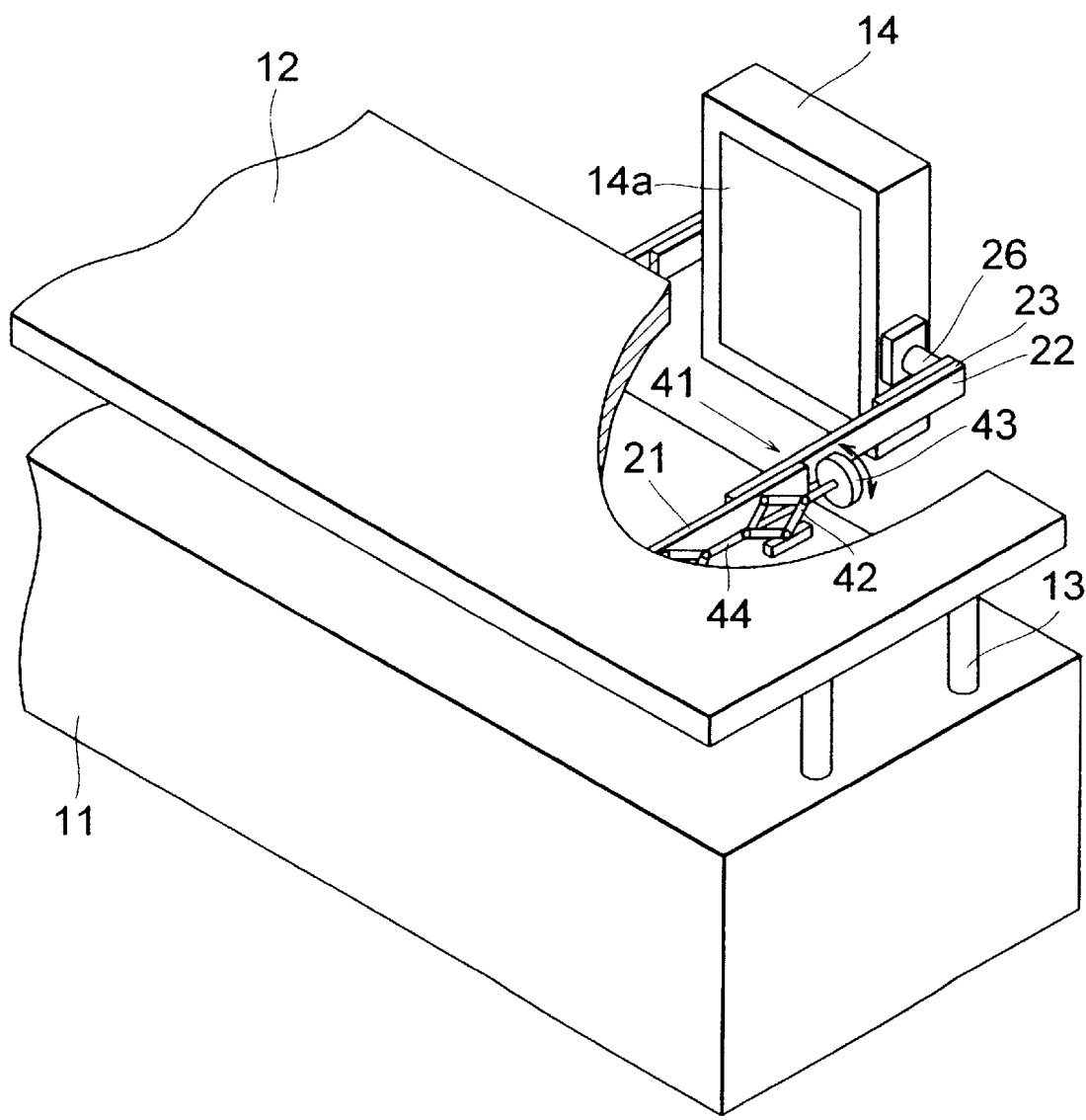
FIG. 9 is a partially cutaway perspective view of a third embodiment of the present invention.

FIG. 9 is a partially cutaway perspective view of a third embodiment of the present invention. A lifting mechanism 41 is provided to vertically drive the X-ray image receiver together with the first guide members 21. That is, the lifting mechanism 41 has the first guide members 21, first sliding members 22, second sliding members 23, and rotation link member 26 as in the first embodiment. The rotation link member 26 is secured to the X-ray image receiver 14. A clearance which is enough to move up and down the first guide members 21 is provided between the support bench 11 and tabletop 12. The first guide members 21 are attached through a lifting mechanism 41 to the support bench 11. The first guide members 21 are supported through, for example, two pairs of links 42 by the support bench 11. Using a connecting shaft 44 with a knob 43, the links 42 are connected together. Thus by rotating the knob 43, the link 42 can be driven to drive the entire first guide members 21 up and down to adjust the level of the X-ray image receiver 14.

The third embodiment gives the same advantages as the second embodiment. Moreover, the third embodiment allows the X-ray image receiver, which is below the tabletop 12, to be moved up and down. Thus the X-ray image receiver can be moved farther away from a test subject than usual, and so-called close-up radiography is possible which helps observe a part of a test subject in detail.

Figure 10:
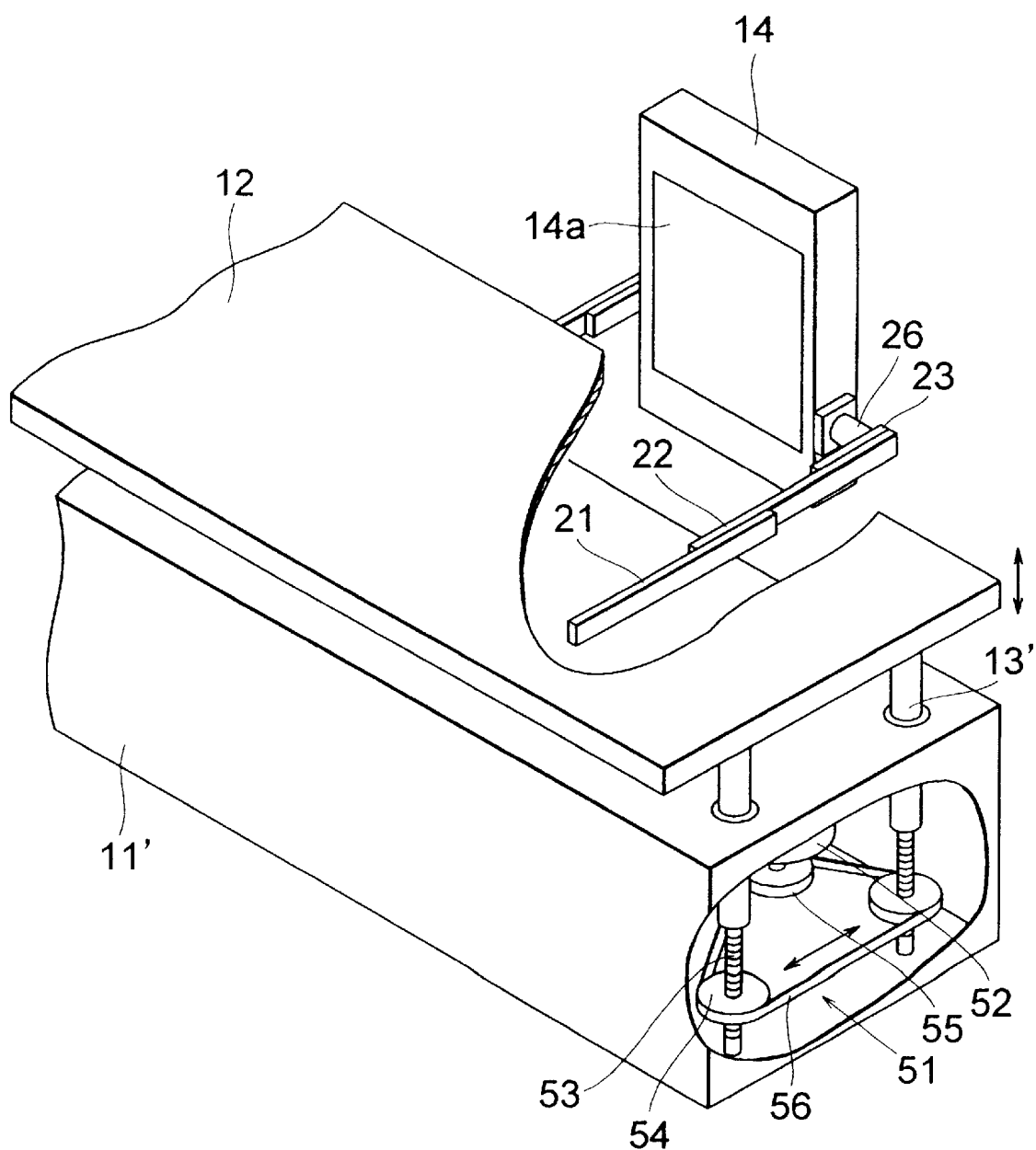
FIG. 10 is a partially cutaway perspective view of a fourth embodiment of the present invention.

FIG. 10 is a partially cutaway perspective view of the fourth embodiment of the present invention. By moving the tabletop 12 up and down, the vertical distance between the tabletop 12 and X-ray image receiver can be changed. The X-ray image receiver 14 is supported by the first guide members 21, first sliding members 22, second sliding members 23, and rotation link member 26. The lower part of a support 13' which supports the tabletop 12 is extended into a support bench 11'. The tabletop 12 can be moved up and down, using a lifting mechanism 51 in the support bench 11'.

The lifting mechanism 51 comprises a drive motor 52, a threaded shaft 53 which is screwed into the support 13', a pulley 54 which is secured to the threaded shaft 53, a pulley 55 which is secured to the drive motor 52, a belt 56 combined with the pulleys 54 and 55, a switch (not shown) which is used to turn on and off the drive motor 52, etc.

In the fourth embodiment, operating the switch or the like causes the level of the tabletop 12 to be changed, thus giving the same advantages as in the third embodiment.

The first through fourth embodiments use a digital X-ray detector in the X-ray image receiver 14. However, the present invention is not limited to such an arrangement. For example, substituting for the digital X-ray detector or the X-ray image receiver a cassette which contains a film or a photostimulable phosphor sheet gives the same advantages.

The above-described radiographic table with a radiation image receiver or radiographic apparatus according to the present invention are adapted so that the vertical position of the radiation image receiver in the vertical posture with respect to the tabletop can be changed. Thus the radiographic region covered by the radiation image receiver (the position or the posture of the radiation image receiver) can be properly adjusted according to a test subject, a method for radiographing a test subject (i.e., the direction in which a test subject is exposed to radiation and the posture of the subject), etc. This, in turn, means that a test subject can be radiographed in suitable condition, thus providing a radiograph useful for diagnosis.

Figure 11:
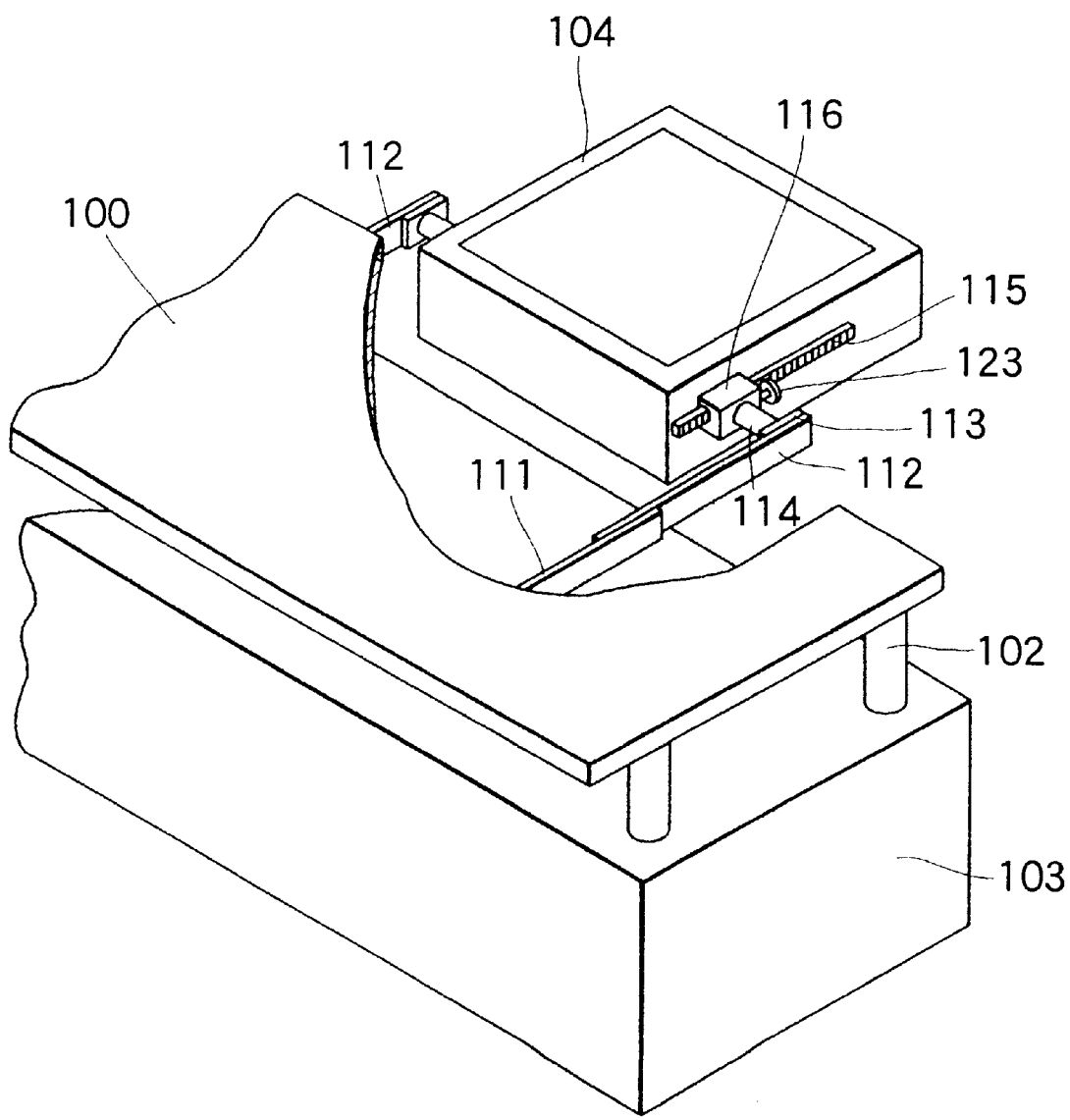
FIG. 11 is a partialy cutaway perspective view of an embodiment required by the present invention.
Figure 12:
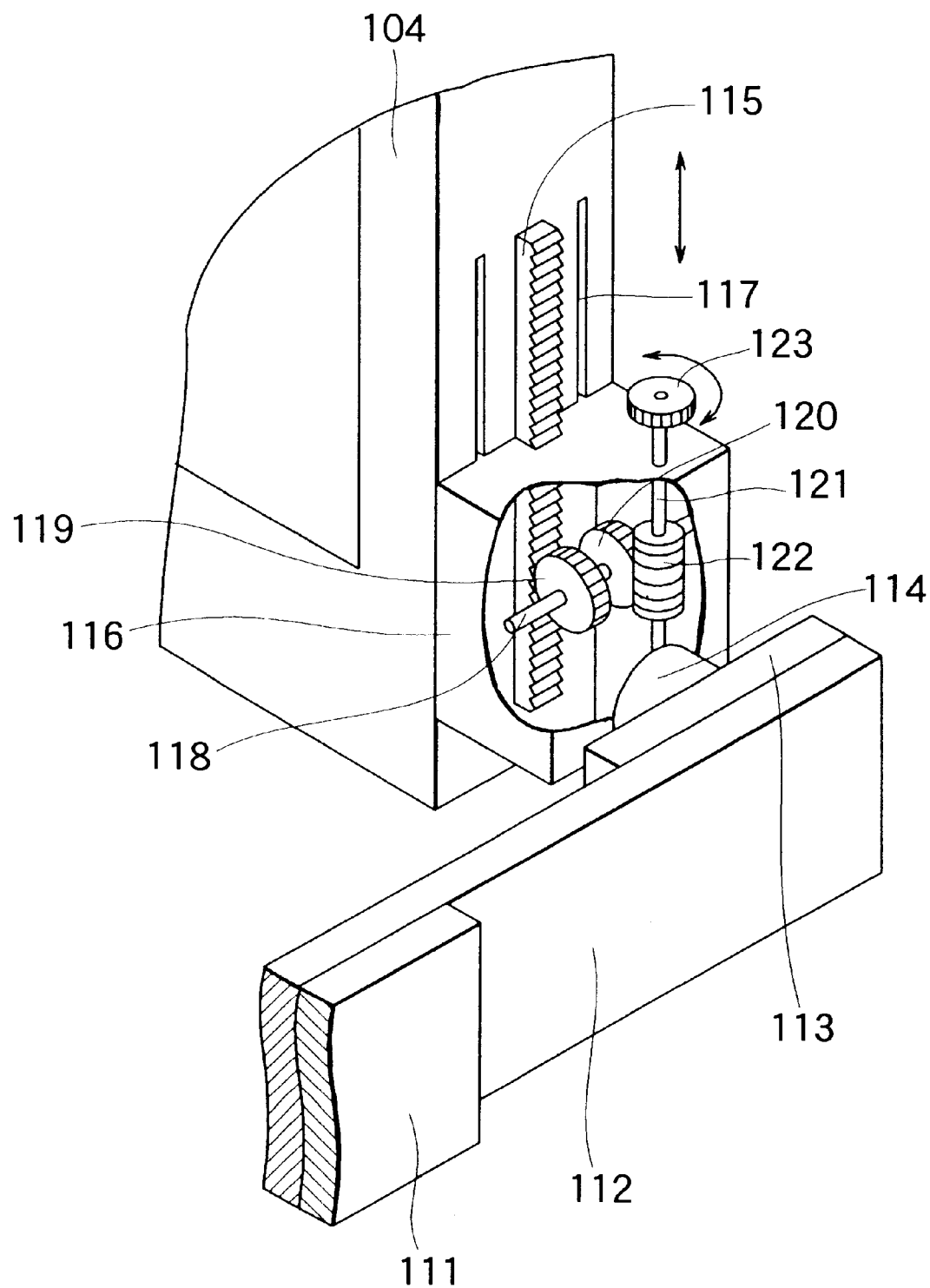
FIG. 12 is a partially enlarged perspective view of an embodiment required by the present invention, with a portion cutaway.

Referring now to FIGS. 11 and 12, a premise of other embodiments will be described below.

As shown in FIG. 11, a radiographic table has means for changing the position of an X-ray image receiver 104. When a test subject on the radiographic table is radiographed using a tube above a tabletop 100, X-rays are aimed at the test subject, lying on his or her back or face on the tabletop 100, from the tube T (see FIG. 3) and received using the X-ray image receiver 104, disposed horizontally under the tabletop 100.

On the other hand, when the test subject S is radiographed using the tube T' (see FIG. 3) on the side of the tabletop 100, first sliding members 112 are slid horizontally along first guide members 111, and then second sliding members 113 are slid horizontally along the first sliding members 112 to pull the X-ray image receiver 104 horizontally on the side of the tabletop 100. Next, a rotation link member 114 is rotated with respect to the second sliding members 113 to change the X-ray image receiver 104 to a vertical posture.

FIG. 12 is a partially enlarged perspective view of a mechanism which adjusts the vertical position of the X-ray image receiver 104. A rack 115 is secured on each side of the X-ray image receiver 104. A second box-like guide member 116, which is secured to the rotation link member 114, is connected with each side of the receiver. For example, the second guide member 116 has a dovetail which fits into a dovetailed groove 117 provided in the X-ray image receiver 104. Using this dovetail joint, the X-ray image receiver 104 is slidably attached to the second guide member 116.

The rack 115 is engaged with a pinion 119 which is supported through a gear shaft 118 in the second guide member 116. A wheel gear 120 is supported on the gear shaft 118. The wheel gear 120 is engaged with a worm gear 122 which is supported through the gear shaft 121. The gear shaft 121 is provided with a knob 123 outside the second guide member 116.

To adjust the vertical distance between the tabletop 100 and X-ray image receiver 104, the knob 123 is rotated. This rotation causes the worm gear 122 to rotate, thus rotating the wheel gear 120 and pinion 119 together. As a result, the rack 115 move up and down, so that the X-ray image receiver 104 also moves up and down.

As described above, it is made possible to change the set position, in the vertical direction, of the X-ray image receiver 104 with respect to the tabletop 100. By moving the X-ray image receiver 104 horizontally, changing the X-ray image receiver to a vertical posture, or then changing the position of the X-ray image receiver in the vertical direction, the radiographic region covered by the X-ray image receiver 104 can be set according to a test subject or a radiographing method. The present invention allows a test subject to be radiographed in suitable condition, using the x-ray image receiver 104 only, thus providing a radiograph useful for diagnosis. The x-ray image receiver 104 can be set in suitable position or posture according to various required postures of a test subject.

However, to radiograph a test subject in the various condition as described above (with respect to radiation direction for the subject and posture of the subject during radiographing), the position and angle of an X-ray source, or an X-ray tube, needs to be suitably set. In a conventional radiographic apparatus having a lifting radiographic table with a movable tabletop, the level of the tube varies in accordance with that of the tabletop. In such apparatus, means are used for keeping constant the distance between the tube and the X-ray image receiver, which is under the tabletop. The means allows a radiographer to radiograph a test subject at any position in height of the tabletop.

However, the automatic setting operation of the X-ray tube in accordance with the movement of the X-ray image receiver along the shorter side of the tabletop 100, the movement of the posture to the vertical state after the movement along the shorter side of tabletop 100, and the vertical movement in the vertical state, is not executed. Thus a radiographer must manually position the X-ray tube every time the X-ray image receiver 104 moves. This operation is troublesome.

When a test subject is radiographed using a grid, the X-ray tube must be positioned accurately. Since the grid has a specific focal point, the tube must be not only at the center of the radiographic region but also spaced apart from the grid accurately by the focal length of the grid. Thus a radiographer must execute such positioninig operation quickly and accurately, considering the test subject who is in the posture to be radiographed. If a striped grid which has a focal point is used in its normal installation, positioning the tube vertically must be executed more precisely than positioning it horizontally when the X-ray image receiver is in the vertical posture. When the X-ray image receiver is horizontal, positioning the tube along the shorter side of the tabletop must be more precise than positioning it along the longer side.

Figure 13:
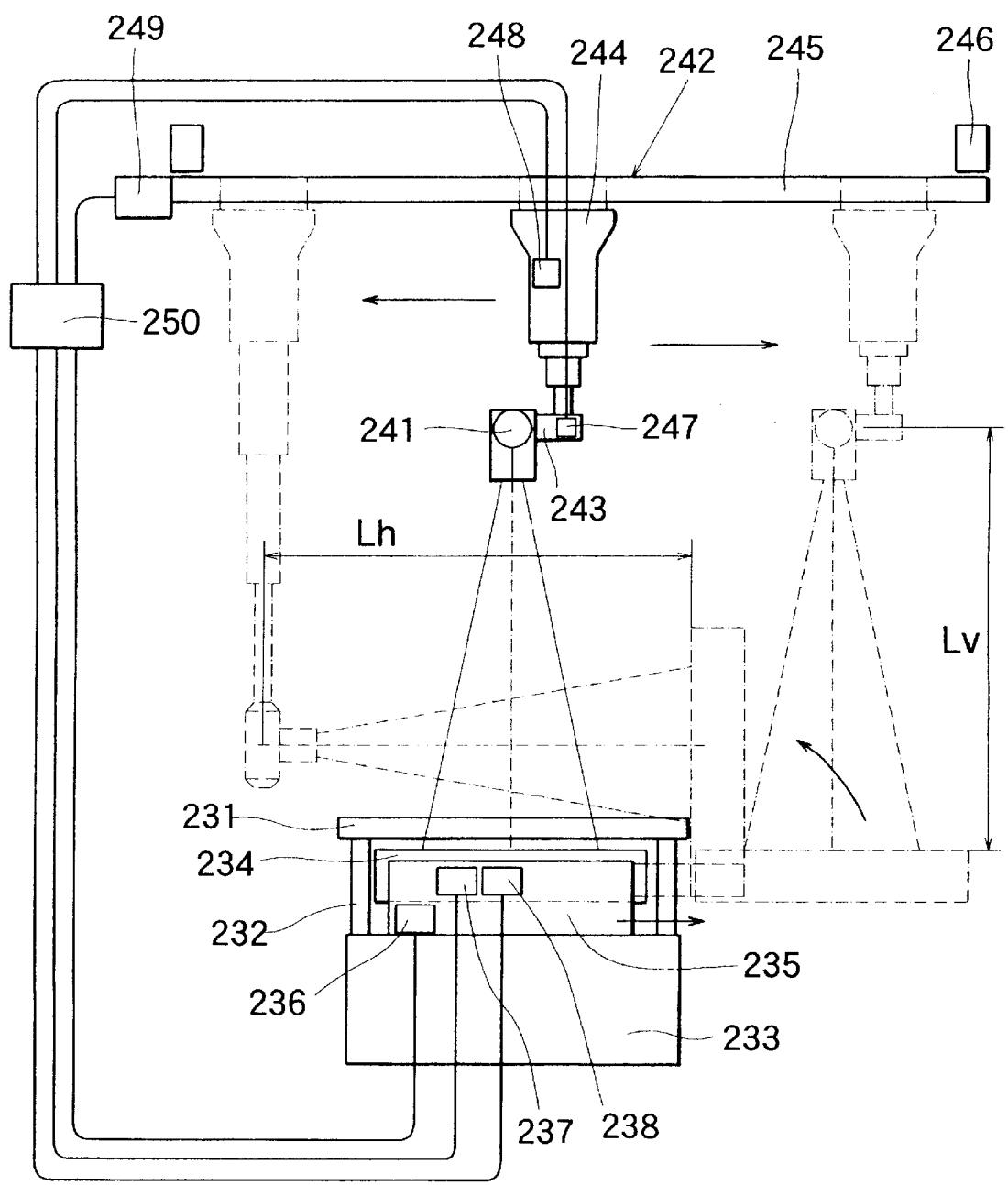
FIG. 13 shows an arrangement of a fifth embodiment of the present invention.
Figure 14:
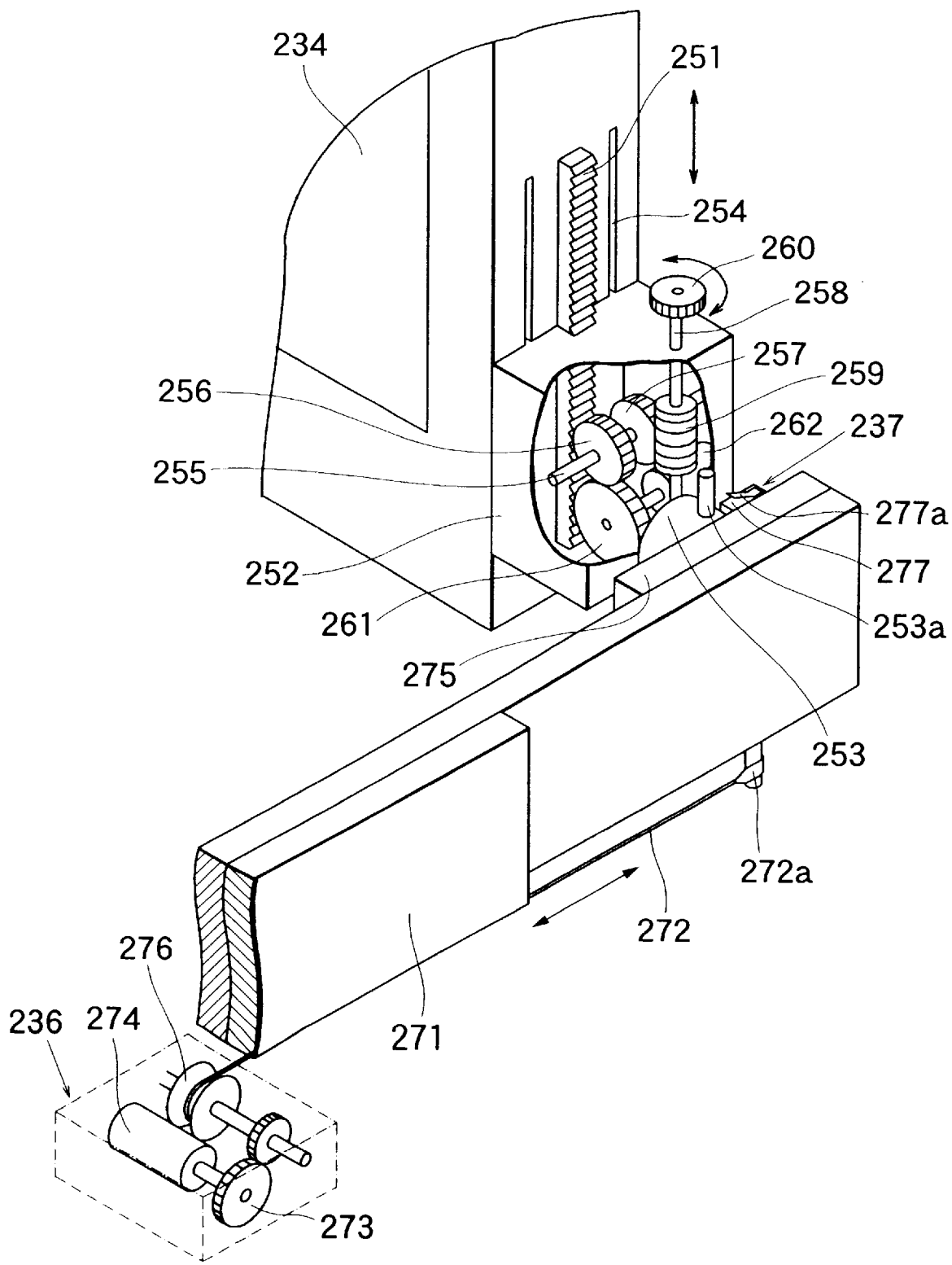
FIG. 14 is a partially enlarged perspective view of a guide mechanism, with a portion cutaway.
Figure 15:
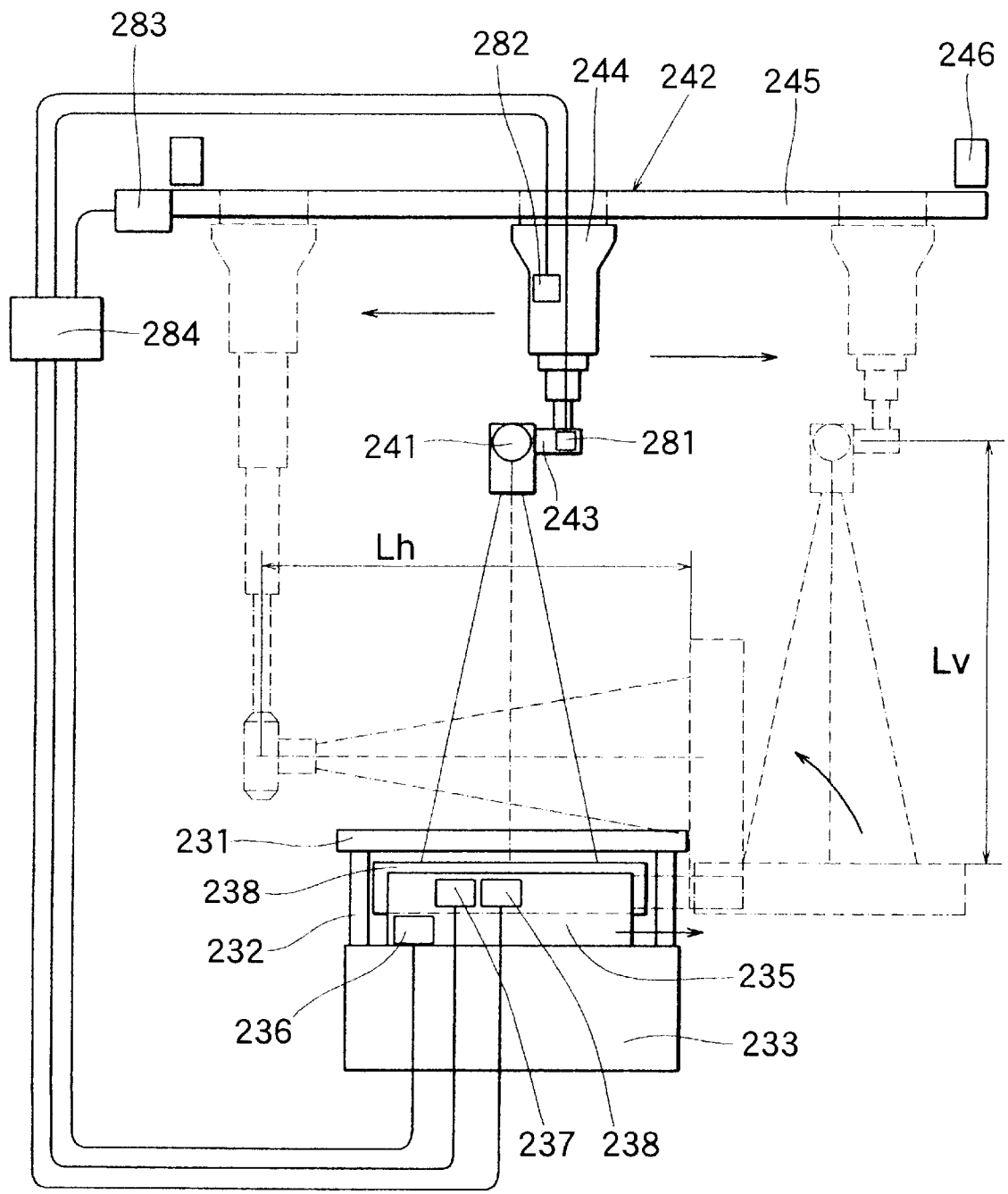
FIG. 15 shows an arrangement of a sixth embodiment of the present invention.

Referring to FIGS. 13 through 15, embodiments according to the present invention, made to solve the above problem, will be described in detail below.

FIG. 13 is a schematic view of a radiographic apparatus according to the fifth embodiment. A tabletop 231 on which a test subject lies is made of an acrylic plate, a carbon plate, etc. The tabletop is substantially horizontally supported through supports 232 at four corners by a support bench 233. An X-ray image receiver 234 which contains a digital X-ray detector is disposed between the tabletop 231 and the support bench 233. A guide mechanism 235 is provided to move the X-ray image receiver 234 along the shorter side of the tabletop 231. The guide mechanism 235 is provided with a horizontal position detecting means 236, a posture detecting means 237, and a vertical position detecting means 238. The horizontal position detecting means 236 detects the position of the X-ray image receiver 234 in the direction of the shorter side of the tabletop 231. The posture detecting means 237 determines whether the X-ray image receiver 234 is in the horizontal or vertical posture. The vertical position detecting means 238 detects the vertical position of the X-ray image receiver 234 which is in the vertical posture (the position of the X-ray image receiver 234 with respect to a guide member 252 or a rotation link member 253, which are described later).

An X-ray tube 241 is supported above the tabletop 231 by a tube holder 242. The tube holder 242 comprises a rotating unit 243, a lifting unit 244, a sliding unit 245, and a sliding unit 246. The rotating unit 243 can rotate the X-ray tube 241 to change the orientation of the X-ray tube 241. The lifting unit 244 moves the X-ray tube up and down. The sliding unit 245 can slide the X-ray tube along the shorter side of the tabletop 231. The sliding unit 246 can slide the X-ray tube along the longer side of the tabletop 231. The rotating unit 243, lifting unit 244, and sliding unit 245 contain driving means 247, 248, and 249 including a motor and a driver for driving the motor. Based on a signal from the detecting means 236, 237, and 238, tube position controlling means 250 controls the driving means to move the X-ray tube 241 to a proper position.

FIG. 14 is a partially enlarged perspective view of the guide mechanism 235, with a portion cutaway. The figure shows the X-ray image receiver 234 as it is in the vertical posture (the X-ray image receiver 234 is disposed so that its receiving surface lies along the vertical direction). A rack 251 is secured on each side of the X-ray image receiver 234. A guide member 252 like a box is connected with each side of the X-ray image receiver 234. The guide member 252 is secured to a rotation link member 253. The X-ray image receiver 234 is slidably fit into the guide member 252, using, for example, a dovetailed groove 254 provided in the X-ray image receiver 234 and a dovetail (unshown) provided in the guide member 252.

The rack 251 is engaged with a pinion 256 which is supported through a gear shaft 255 provided in the guide member 252. A wheel gear 257 is concentrically supported on the gear shaft 255. The wheel gear 257 is engaged with a worm gear 259 which is supported through the gear shaft 258 by the guide member 252. A knob 260 is attached to the gear shaft 258 outside the guide member 252. The pinion 256 is engaged with a gear 261 in the guide member 252. A variable resistor 262, such as a potentiometer, is connected with the gear 261, using a shaft.

The horizontal position detecting means 236, which detects the position of the X-ray image receiver 234, is attached to the guide member 271 or the like, of the guide mechanism 235, which is secured to the support bench 233. The horizontal position detecting means 236 comprises a wire 272, a gear train 273, and a variable resistor 274 constituting the potentiometer. One end 272a of the wire 272 moves together with the X-ray image receiver 234. The end is attached to the second sliding member 275, by which the rotation link member 253 is supported.

Starting with the other end, a plurality of turns of wire 272 are made around a pulley 276 in the gear train 273. The shaft of the variable resistor 274 is coupled with the gear train 273. As the X-ray image receiver 234 moves, the wire 272 is pulled in the direction indicated by an arrow, thus rotating the pulley 276, which rotates the shaft of the variable resistor 274 through the gear train 273. Thus movement of the X-ray image receiver 234 can be detected by observing a change in the resistance of the variable resistor 274.

The posture detecting means 237, which comprises a microswitch 277 or a photointerrupter etc., is installed near the rotation link member 253. The rotation link member 253 is provided with a bump 253a. When the X-ray image receiver 234 is in the horizontal posture, the bump 253a pushes the lever 277a of the microswitch 277. When the X-ray image receiver 234 is in the vertical posture, on the other hand, the bump 253a moves away from the lever 277a. The microswitch 277 is disposed so that the bump behaves in such a manner. Thus it can be determined whether the X-ray image receiver 234 is in the horizontal or vertical posture.

To radiograph a test subject lying on the tabletop 231 from above, using a photographic apparatus arranged as describe above, X-rays from the X-ray tube 241 above the tabletop 231 are aimed at the test subject, with the X-ray image receiver 234 horizontally disposed under the tabletop 231.

When a test subject is radiographed without the tabletop 231, the X-ray image receiver 234 is pulled out sideward from under the tabletop 231 to expose the receiving surface of the X-ray image receiver 234. The pulley 276 rotates, thus rotating the shaft of the variable resistor 274 through the gear train 273 as the X-ray image receiver 234 is pulled out. The amount of rotation of the shaft, which is detected through a change in the resistance of the variable resistor 274, is sent as an electrical signal to the tube position controlling means 250. The tube position controlling means 250 sends a signal to the driving means 249 so that the X-ray tube 241 travels the same distance as the X-ray image receiver 234. The X-ray tube 241 moves horizontally, with the distance Lv between the X-ray tube 241 and X-ray image receiver 234 kept constant. The tube stops when it aligns with the center of the receiving surface of the X-ray image receiver 234.

The embodiment is adapted so that the horizontal position of the X-ray image receiver 234 can be detected even when it is pulled out a certain distance. Alternatively, the embodiment can be adapted so that sensors such as one or two microswitches are used to determine whether the X-ray image receiver 234 is at a predetermined position under the tabletop 231 or a predetermined position on the side of the tabletop 231 when a test subject is radiographed. In this case, the X-ray image receiver takes these predetermined positions only. A moving mechanism for the X-ray tube 241 should be designed to automatically stop at one of the two positions.

To radiograph a test subject from the side, the X-ray image receiver 234 is pulled out on the side of the tabletop 231 and rotated using the rotation link member 253 until the receiver is in the vertical posture. When the posture of the X-ray image receiver 234 changes from a horizontal posture to a vertical posture, the posture detecting means 237 detects the change and informs the tube position controlling means 250 of it. The tube position controlling means 250 sends to driving means 247 for changing the orientation of the X-ray tube 241 a signal for rotating the X-ray tube 241 so that irradiation of X-rays changes from a downward direction to a horizontal direction.

To move the X-ray tube 241 to a position at a predetermined horizontal distance Lh from the X-ray image receiver 234, a signal is sent to the driving means 249, which is for moving the X-ray image receiver 241 along the shorter side of the tabletop 231. To lower the X-ray tube 241 to the level of the center of the receiving surface of the X-ray image receiver 234 when it is in the vertical posture, a signal is sent to the driving means 248, which is for lifting or lowering the X-ray tube 241. The signal causes the X-ray tube 241 to move to a position where the tube aligns with the center of the receiving surface of the X-ray image receiver 234 so that the tube faces the center.

When adjusting the relative distance in the vertical direction between the tabletop 231 and the X-ray image receiver 234, the knob 260 is rotated in the direction indicated by an arrow. This rotation causes the worm gear 259 to rotate, thus rotating the wheel gear 257 and pinion 256 together. As a result, the rack 251 moves, so that the X-ray image receiver 234 moves up and down. Rotation of the pinion 256 is transmitted to the gear 261, thus rotating the shaft of the variable resistor 262. This allows a change in the vertical position of the X-ray image receiver 234 to be detected through a change in the resistance of the variable resistor 262.

As described above, when the level of the X-ray image receiver 234 is changed when the receiver is in the vertical posture, the distance traveled by the X-ray image receiver, which distance is detected through a change in the resistance of the variable resistor 262, is sent as an electrical signal to the tube position controlling means 250. The tube position controlling means 250 sends a signal to the driving means 248 so that the X-ray tube 241 travels the same distance as the X-ray image receiver 234. The X-ray tube 241 moves vertically, with the distance Lh between the X-ray tube 241 and X-ray image receiver 234 kept constant. The tube stops when it aligns with the center of the receiving surface of the X-ray image receiver 234.

FIG. 15 illustrates a sixth embodiment. In the fifth embodiment, each of the rotating unit 243, lifting unit 244, and sliding unit 245 contains driving means 247, 248 and 249 for driving these units, such as motors and drivers, and the position of the tube is automatically controlled in response to a signal from the tube position controlling means 250. In the sixth embodiment, on the other hand, the rotating unit 243, lifting unit 244, and sliding unit 245 contain tube position detecting means 281, 282, and 283, respectively instead of driving means, such as motors and drivers. Output from the detecting means is connected to position comparing means 284.

As in the fifth embodiment, a signal is fed from the horizontal position detecting means 236, posture detecting means 237, and vertical position detecting means 238 to the position comparing means 284.

Using such an arrangement, a radiographer can manually move the X-ray tube 241 if the position of the X-ray image receiver 234 changes. The distance traveled by the X-ray tube is detected by the tube position detecting means 281, 282, and 283 and sent to the position comparing means 284. The distance is compared with a required value calculated based on outputs from the detecting means 236, 237, and 238 concerning the X-ray image receiver 234. If the distance agrees with the value, a lock signal is sent to each unit of the tube holder 242, that is, the rotating unit 243, lifting unit 244, and sliding unit 245, and then a lock mechanism, not shown, operates to secure the X-ray tube 241.

Unlike the fifth embodiment, the. sixth embodiment requires a photographer to take the trouble to move the tube. However, the sixth embodiment needs no tube driving mechanism, thus simplifies the entire apparatus, and reduces cost.

The above-described embodiments use a digital X-ray detector in the X-ray image receiver. However, the embodiments are not limited to such arrangements. For example, using a cassette containing a film or a photostimulable phosphor sheet offers the same advantages.

Referring to the fifth and sixth embodiments, radiographic apparatuses and radiographic systems according to the present invention have been described above. The apparatuses and systems have means for properly moving a tube with respect to a radiation image receiver which is held in a horizontal or vertical posture to suitably radiograph a test subject. The means eases a radiographer and prevents faulty radiography due to improper positioning, thus providing a radiograph useful for diagnosis.

What is claimed is:

1. A radiographic apparatus comprising:
   a tabletop for bearing a test subject;
   a radiation image receiver for taking a radiograph of the test subject; and
   a guide mechanism that guides movement of the radiation image receiver when the receiver moves horizontally from a first position, which is under a test subject bearing surface of the tabletop, to a second position which is outside a region under the test subject bearing surface, that guides movement of the radiation image receiver when the receiver is switched to be in a horizontal posture or a vertical posture at the second position, and that guides a vertical movement of the radiation image receiver, in the vertical posture, relative to the tabletop.

2. The radiographic apparatus according to claim 1, wherein the guide mechanism comprises:
   a rotation shaft for guiding a movement of the radiation image receiver when it is switched to be in a horizontal posture or a vertical posture; and
   a vertical guide mechanism for guiding a movement of the radiation image receiver the direction of which is perpendicular to the rotation shaft and along the receiving surface of the radiation image receiver.

3. The radiographic apparatus according to claim 1, further comprising:
   a mark for indicating the vertical position of the radiation image receiver in the vertical posture.

4. The radiographic apparatus according to claim 2, wherein the vertical guide mechanism further comprises:
   a lock member for switching the radiation image receiver between locking state or unlocking state.

5. The radiographic apparatus according to claim 2, wherein the vertical guide mechanism further comprises:
   a drive member for moving the radiation image receiver.

6. The radiographic apparatus according to claim 5, wherein the drive member comprises:
   a worm gear; and
   a manual operation member for rotating the worm gear.

7. The radiographic apparatus according to claim 1, wherein the guide mechanism comprising:
   a horizontal guide mechanism for guiding a movement of the radiation image receiver when it moves horizontally; and
   a vertical guide mechanism for guiding a movement of the radiation image receiver and the horizontal guide mechanism when the receiver and the horizontal guide mechanism move vertically.

8. The radiographic apparatus according to claim 1, wherein the guide mechanism comprises:
a tabletop lifting mechanism for lifting or lowering the tabletop to change the vertical position of the tabletop with respect to the radiation image receiver.

9. The radiographic apparatus according to claim 1, wherein the second position is apart from the first position along the direction parallel to the shorter side of the tabletop.

10. The radiographic apparatus according to claim 1, further comprising:
a grid for reducing incidence of scattered X-rays on the radiation image receiver, which is disposed in front of the receiver.

11. The radiographic apparatus according to claim 1, wherein the radiation image receiver comprises:
a radiation detector comprising two-dimensionally laid out solid-state detection elements; and
a signal reading circuit which reads a signal from the radiation detector.

12. A radiographic apparatus comprising:
a tabletop for bearing a test subject;
a radiation image receiver for taking a radiograph of the test subject;
a guide mechanism for guiding a movement of the radiation image receiver when the receiver moves horizontally from a first position which is under a test subject bearing surface of the tabletop to a second position which is outside a region under the test subject bearing surface, for guiding a movement of the radiation image receiver when the receiver is switched to be in a horizontal posture or a vertical posture at the second position, and for guiding movement of the radiation image receiver when the receiver moves vertically relative to the tabletop with its posture vertical;
an X-ray generator which comprises an X-ray tube for emitting X-rays; and
a controller which controls disposition of the X-ray tube according to disposition of the radiation image receiver guided by the guide mechanism.

13. The radiographic apparatus according to claim 12, wherein the controller comprises:
a first sensor for detecting the horizontal position of the radiation image receiver;
a second sensor for detecting whether the radiation image receiver is in the horizontal posture or vertical posture; and
a third sensor for detecting the vertical position of the radiation image receiver in the vertical posture.

14. The radiographic apparatus according to claim 13, wherein the controller further comprises:
driving means for moving the X-ray tube; and
a tube disposition controller for controlling the driving means based on output from the first, second, and third sensors.

15. The radiographic apparatus according to claim 13, further comprising:
a tube guide mechanism for guiding movement of the X-ray tube when the tube is moved manually, wherein the controller comprises:
a fourth sensor for detecting the position of the X-ray tube; and
a lock controller for determining the position to be locked of the X-ray tube guided by the tube guide mechanism based on the output from the first, second, third, and fourth sensors.

16. The radiographic apparatus according to claim 12, wherein the second position is away from the first position along the direction parallel to the shorter side of the tabletop.

17. The radiographic apparatus according to claim 12, further comprising:
a grid for reducing incidence of scattered X-rays on the radiation image receiver, which is disposed in front of the receiver.

18. The radiographic apparatus according to claim 12, wherein the radiation image receiver comprises:
a radiation detector having two-dimensionally laid out solid-state detection elements; and
a signal reading circuit which reads a signal from the radiation detector.

19. A radiographic table with a radiation image receiver, comprising:
a tabletop on which a test subject lies;
a support bench which is under the tabletop and supports the radiation image receiver; and
a mechanism which allows the radiation image receiver to be disposed on a side of the tabletop in a posture and substantially vertically moved relative to the tabletop while maintaining the posture.

20. A radiographic table with a radiation image receiver according to claim 19, comprising:
a mechanism which allows the radiation image receiver to be rotated to dispose its receiving surface substantially vertically and changes substantially the vertical position of the radiation image receiver after its rotation.

21. A radiographic table with a radiation image receiver, comprising:
a tabletop on which a test subject lies;
a radiation image receiver which is disposed under the tabletop;
first guide members which allow the radiation image receiver to move along the direction parallel to the shorter side of the tabletop;
second guide members which allow the radiation image receiver which protrudes from the tabletop by the first guide member to rotate so that its receiving surface is disposed substantially vertically; and
third guide members which allow the radiation image receiver which protrudes from the tabletop by the first guide members to be substantially vertically moved relative to the tabletop, while maintaining a posture, after the receiver is allowed to rotate by the second guide members.

22. A radiographic table with a radiation image receiver according to claim 21, wherein the third guide members guide movement of the radiation image receiver with respect to a rotation shaft about which the receiver is allowed to rotate by the second guide members.

23. A radiographic table with a radiation image receiver according to claim 21, wherein the third guide members change the position of the radiation image receiver relative to a rotation shaft about which the receiver is allowed to rotate by the second guide members.

24. A radiographic table with a radiation image receiver according to claim 21, wherein the third guide members move the first guide members together with the second guide members.

25. A radiographic table with a radiation image receiver according to claim 21,
wherein the third guide members move the tabletop.

26. A radiographic table with a radiation image receiver according to any of claims 19 and 21,
wherein the radiation image receiver comprises a radiation detector and a signal reading circuit, the detector comprising two-dimensionally laid out solid-state detection elements, and the circuit reading a signal from the detector.

27. A radiographic system which has the radiographic table with a radiation image receiver according to any one of claims 19 and 25 and a radiation source and uses the radiation image receiver to take a radiograph of a test subject due to radiation from the radiation source.

28. A radiographic apparatus comprising:
an X-ray tube which irradiates a test subject with radiation;
a tube holder which supports the X-ray tube;
a tabletop on which a test subject lies;
a radiation image receiver which is disposed under the tabletop;
a support bench which supports the radiation image receiver;
a mechanism which allows the radiation image receiver to move along the direction parallel to the shorter side of the tabletop, to be changed to a vertical posture beside a side of the tabletop, and to be moved substantially vertically relative to the tabletop with its posture vertical beside the side of the tabletop;
a position sensor which detects the position of the radiation image receiver in the direction parallel to the shorter side of the tabletop;
a posture sensor which detects a posture of the radiation image receiver,
a position sensor which detects a vertical position of the radiation image receiver which is in a vertical posture; and
means for aligning the X-ray tube with a center of a receiving surface of the radiation image receiver in an opposed state, based on output from the two position sensors and the posture sensor so that the X-ray tube faces the center.

* * * * *

UNITED STATES PATENT AND TRADEMARK OFFICE
CERTIFICATE OF CORRECTION

PATENT NO. : 6,450,684 B2  Page 1 of 1
DATED : September 17, 2002
INVENTOR(S) : Masaaki Kobayashi It is certified that error appears in the above-identified patent and that said Letters Patent is hereby corrected as shown below:

Column 1,
Line 28, "flouresce." should read -- fluorescence. --

Column 4,
Line 6, "4." should read -- 4". --.
Line 27, "comers." should read -- corners. --.

Column 15,
Line 15, "25" should read -- 21 --.

Signed and Sealed this

Fifth Day of August, 2003

JAMES E. ROGAN
*Director of the United States Patent and Trademark Office*